(12) United States Patent
Chen

(10) Patent No.: US 6,341,790 B1
(45) Date of Patent: Jan. 29, 2002

(54) FRONT WHEEL ASSEMBLY FOR A SKATE VEHICLE

(76) Inventor: Chih-Liang Chen, No. 10, Lane 1431, Kuanghsing Rd., Pateh City, Taoyuan Hsien (TW)

( * ) Notice: Subject to any disclaimer, the term of this patent is extended or adjusted under 35 U.S.C. 154(b) by 0 days.

(21) Appl. No.: 09/816,589

(22) Filed: Mar. 23, 2001

(51) Int. Cl.⁷ .......................... B62M 1/00; B62D 61/06; B62K 21/10
(52) U.S. Cl. .................... 280/87.041; 280/62; 280/267
(58) Field of Search .................. 280/87.01, 87.021, 280/87.03, 87.041, 87.042, 87.043, 87.05, 62, 263, 267, 269

(56) References Cited

U.S. PATENT DOCUMENTS

| | | | | |
|---|---|---|---|---|
| 4,274,647 A | * | 6/1981 | Drake, Jr. .............. | 280/87.041 |
| 4,775,162 A | * | 10/1988 | Chao .................... | 280/87.041 |
| 5,029,887 A | * | 7/1991 | Grutzner et al. ......... | 280/242.1 |
| 5,169,166 A | * | 12/1992 | Brooks .................. | 280/87.042 |
| 6,206,388 B1 | * | 3/2001 | Ouboter ................. | 280/87.041 |

* cited by examiner

*Primary Examiner*—Lanna Mai
*Assistant Examiner*—Jeff Restifo
(74) *Attorney, Agent, or Firm*—William E. Pelton, Esq.

(57) ABSTRACT

A front wheel assembly for a skate vehicle includes a casing mounted on the frame of the skate vehicle and forms an acute angle with the horizontal portion of the frame. Two holes are defined in a bottom of the casing. A shaft rotatably extends through each hole in the casing and has a first end and a second end. A drive gear is secured on the first end of each shaft, and a block having a hole defined to securely receive the shaft is secured near the second end of each shaft. One end of an axle is secured on each block, and a wheel is mounted on the other the other end of each axle. A gear is rotatably mounted in the casing and engaged to the two drive gears. The front wheel assembly makes skate vehicle turned when the skate vehicle is leaned.

12 Claims, 7 Drawing Sheets

FRONT WHEEL ASSEMBLY FOR A SKATE VEHICLE

BACKGROUND OF THE INVENTION

1. Field of the Invention

The present invention relates to a front wheel assembly, and more particularly to a front wheel assembly for a skate vehicle. The front wheel assembly makes the skate vehicle turn when the skate vehicle is inclined to the ground.

2. Description of Related Art

A conventional skate vehicle such as a scooter in accordance with the prior art comprises a four-bar linkage including two suspension levers with a front wheel attached to each suspension lever. The four-bar linkage and the scooter are formed at an angle offset from vertical. By such a manner, the four-bar linkage can cause a horizontal distributed force to push the two suspension levers and turn when the scooter is inclined relative to the ground.

However, conventional scooters do not provide a restitution device to the linkages to help a rider return the scooter to horizontal when a turn is complete. Furthermore, the torque force of the scooter during a turn is all loaded on the pivot pins that connect the four linkages. This stress will shorten the useful life of the pivot pins.

The present invention has arisen to mitigate and/or obviate the disadvantages of the conventional skate vehicle.

SUMMARY OF THE INVENTION

The main objective of the present invention is to provide an improved a front wheel assembly for a skate vehicle. The front wheel assembly for a skate vehicle includes a casing mounted at a corner of an L-shaped frame of the skate vehicle and forming an acute angle with a horizontal portion of the main frame. The casing has a top and a bottom. Two through holes are defined in the bottom of the casing. A shaft rotatably extends through the through hole in the casing and has a first and a second end. A drive gear is secured on the first end of the shaft, and a block with a through hole defined to securely receive the shaft is secured near the second end of the shaft. One end of an axle is secured on the block, and a wheel is mounted on the other end of the axle. A middle gear is pivotally mounted in the casing between and engaged to two drive gears. The front wheel assembly makes the skate vehicle turn when the skate vehicle is leaned.

Further benefits and advantages of the present invention will become apparent after a careful reading of the detailed description with appropriate reference to the accompanying drawings.

DETAILED DESCRIPTION OF THE INVENTION

Figure 1:
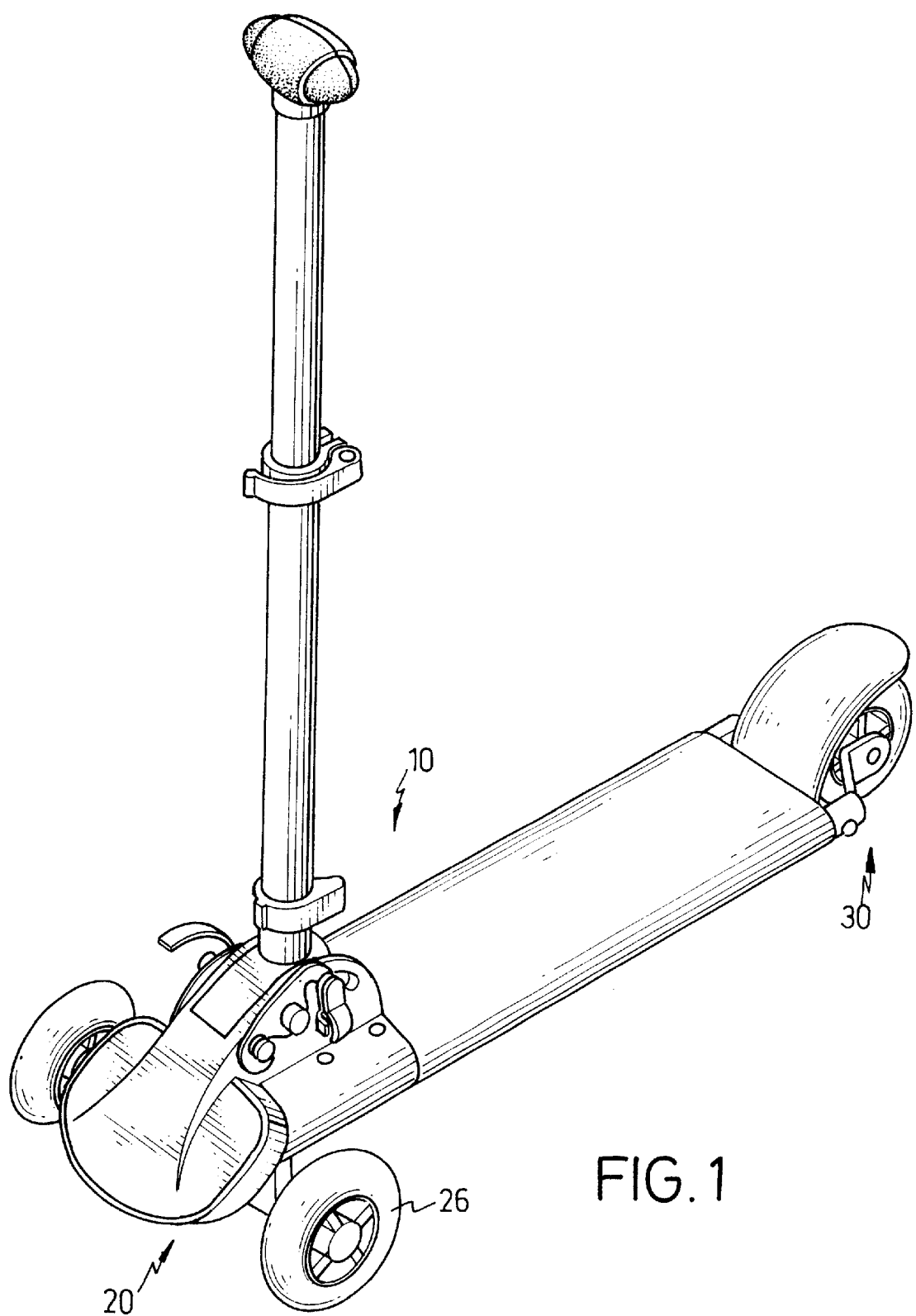
FIG. 1 is a perspective view of a scooter with a front wheel assembly in accordance with the present invention.
Figure 2:
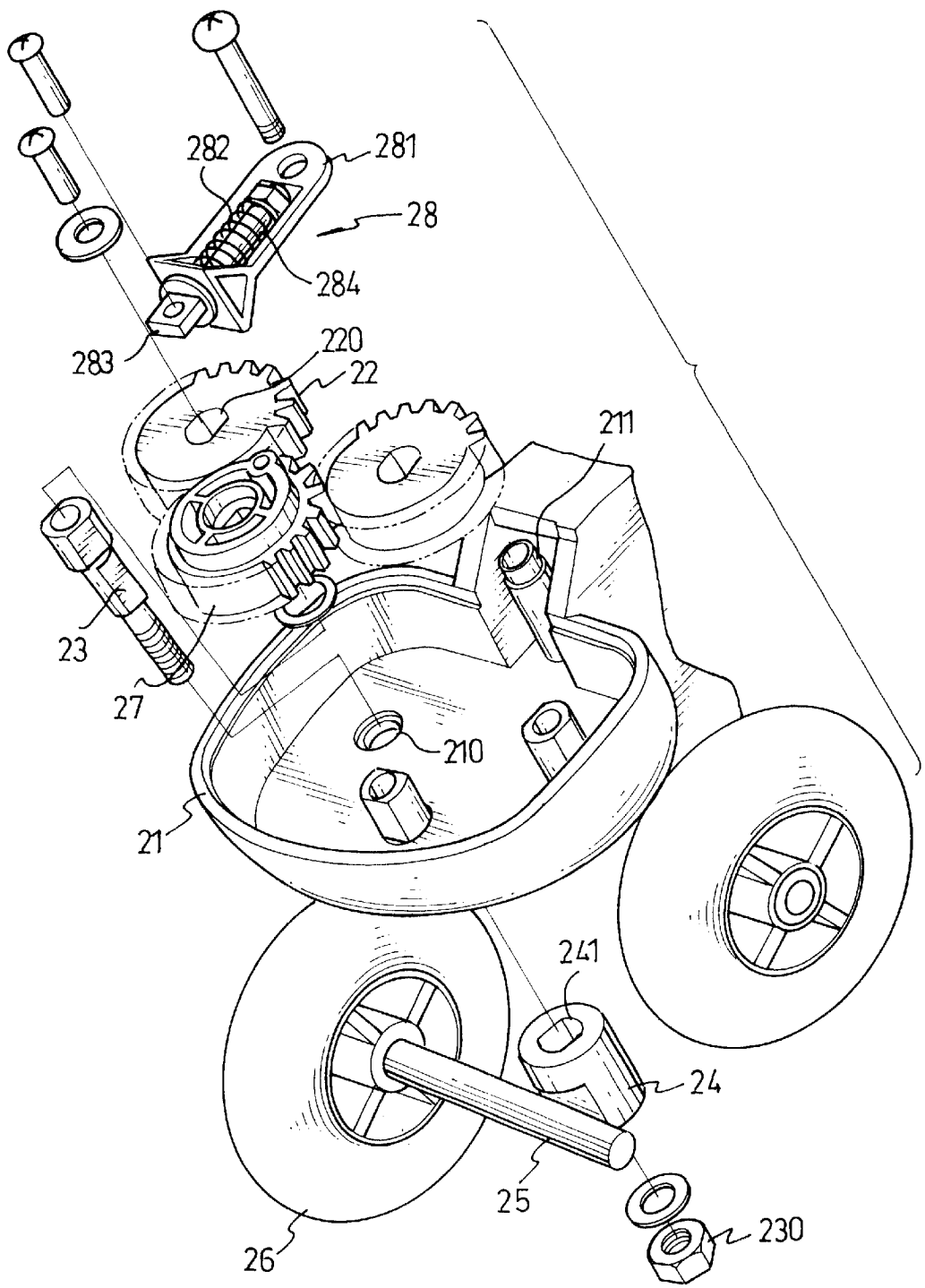
FIG. 2 is an enlarged partially exploded perspective view of the front wheel assembly in FIG. 1.
Figure 3:
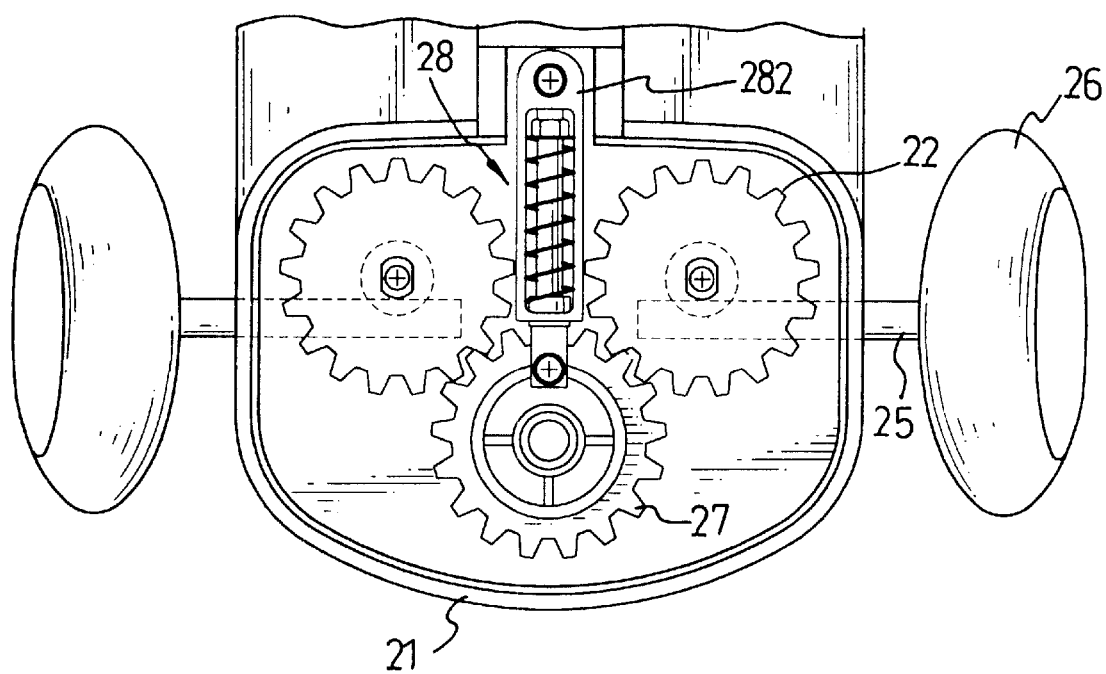
FIG. 3 is a top plan view of the front wheel assembly in FIG. 2.

With reference to the drawings and initially to FIGS. 1–4, a front wheel assembly is part of a skate vehicle. For purposes of illustration, the embodiment of the skate vehicle in the description is a scooter. The scooter comprises an L-shaped main frame (10), a front wheel assembly (20) and a rear wheel (30). The front wheel assembly (20) is mounted at a corner of the main frame (10), and the rear wheel (30) is rotatably mounted on the horizontal portion of the main frame (10) opposite to the front wheel assembly (20).

The front wheel assembly (20) for a skate vehicle in accordance with the present invention includes a casing (21), two polygonal shafts (23), two drive gears (22), two blocks (24), two axles (25), a middle gear (27) and a restitution device (28). Two through holes (210) are defined in a bottom of the casing (21). The bottom of the casing (21) and the horizontal portion of the main frame (10) form an acute angle. The angle in the preferred embodiment is 45 degrees. A polygonal shaft (23) rotatably extends through each through hole (210). Each shaft (23) has a first end and a second end. The first end of each shaft (23) is in the casing (21), and the second end is out of the casing (21). A drive gear (22) is secured on the first end of each shaft (23) by means of a washer and a set screw, for example. A polygonal through hole (220) is defined in each drive gear (22) to receive the first end of one shaft (23). Each block (24) is mounted under the casing (21) and has a polygonal through hole (241) centrally defined to receive the second end of one of the shafts (23). The second end of each shaft (23) is threaded, and a bolt (230) is screwed onto the second end of the shaft (23) to hold the block (24) in place. One end of each axle (25) is secured to the block (24) and a wheel (26) is rotatably mounted on the other end of the axle (25) parallel to the longitudinal axis of the horizontal portion of the L-shaped main frame (10). The axle (25) and the shaft (23) form an acute angle. The middle gear (27) is rotatably mounted in the casing (21) between and meshing with the two drive gears (22) and rotates the two drive gears (22) to control the direction of the scooter. The restitution device (28) is mounted between the middle gear (27) and the casing (21). The restitution device (28) includes a frame (281) having a slot (282) longitudinally defined in the frame (281). The frame (281) includes a first end pivotally attached to a connecting rod (211) vertically extending from the bottom of the casing (21) and a second end with a bottom having a through hole defined to communicate with the slot (280). The through hole in the frame (281) has a diameter smaller than a width of the slot (282). A rod (283) is partially and movably received in the slot (282) in the frame (281) of the restitution device (28). The rod (283) has a first end forming an enlarged head received in the slot (282) and a second end extending through the through hole of the frame (28) to be pivotally connected to the middle gear (27). A spring (284) is compressively mounted around the rod (283) and received in the slot (282). The spring (284) has one end abutting the enlarged head of the rod (283) and the other abutting the bottom of the frame (281) to provide a restitution force to the restitution device (28).

Figure 4:
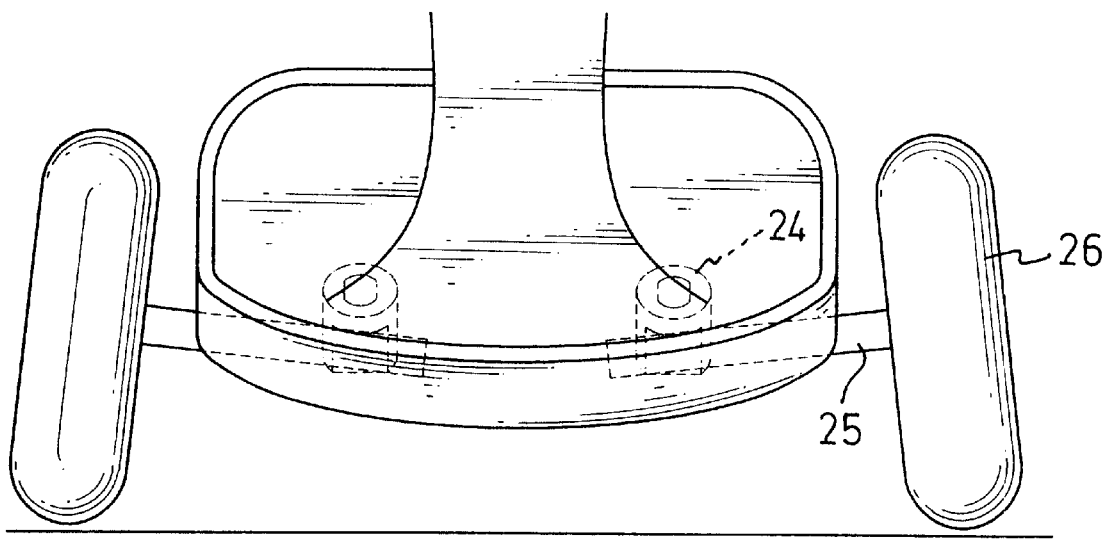
FIG. 4 is a front plan view of the front wheel assembly in FIG. 1.

With reference to FIG. 4, the front wheel assembly (20) is horizontal because the scooter's only load is vertical gravity from the rider, and there is no horizontal component applied to the front wheel assembly (20). Consequently, the scooter can be moved straight.

Figure 5:
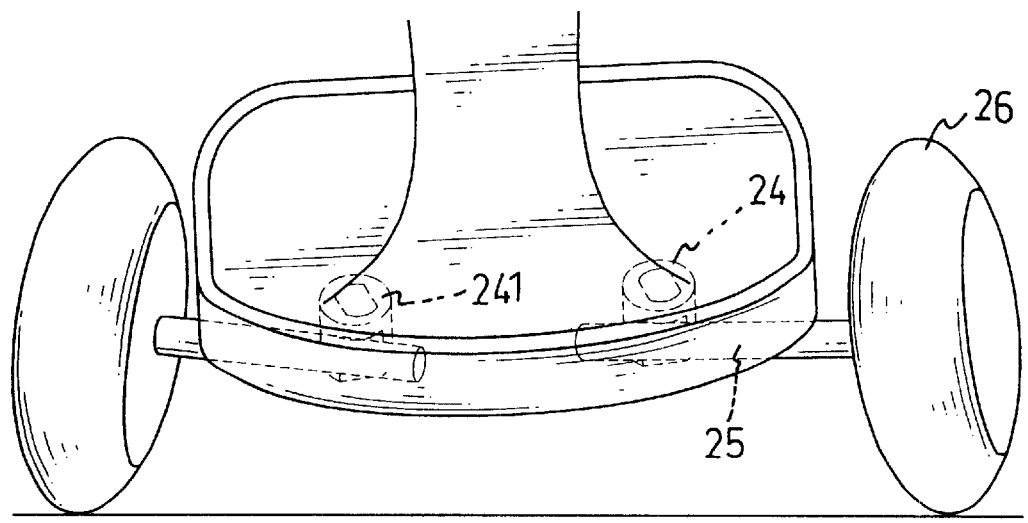
FIG. 5 is a front plan view of the front wheel assembly in FIG. 1 when the scooter turns right.
Figure 6:
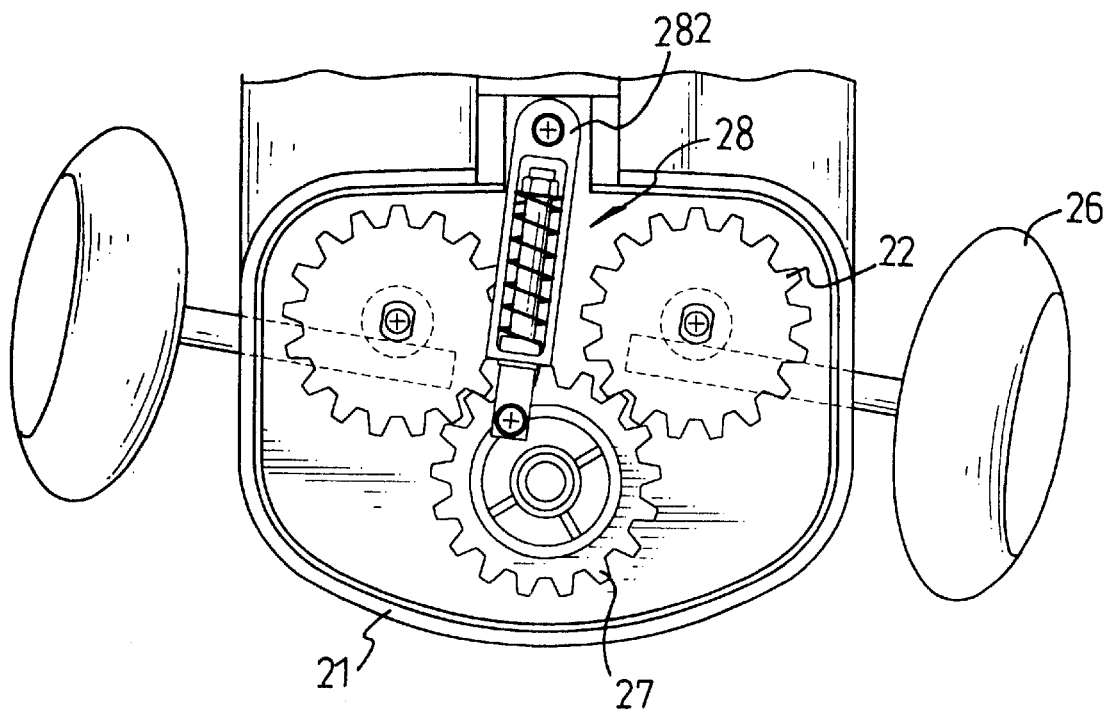
FIG. 6 is a top plan view of the front wheel assembly in FIG. 2 when the scooter turns right.

With reference to FIGS. 5 and 6, when the scooter leans toward the right side of the scooter, the gravity from the rider is divided into a vertical component and a horizontal component. The resultant force of the vertical component is zero since the scooter is not moving in the vertical direction. The horizontal component forms a moment that acts on the front wheel (26) mounted on the right side of the front wheel assembly (20) to make the front wheel (26) mounted on the right side move back. Then, the axle (25) rotates the block (24) so that the drive gear (22) rotates the middle gear (27) that rotates the other drive gear by the polygonal shaft (23) which has one end received in the through hole (241) of the block (24) and the other secured in the through hole (220) of the drive gear (22). The other drive gear (27) mounted in the left side of the casing (21) is rotated by the middle gear (27) to make the other front wheel (26) move relative to the rear wheel (30). Consequently, the two front wheels (26) are deflected toward the right side of the front wheel assembly (20) and form an angle (θ) to make the scooter turn right along the angle (θ).

Figure 7:
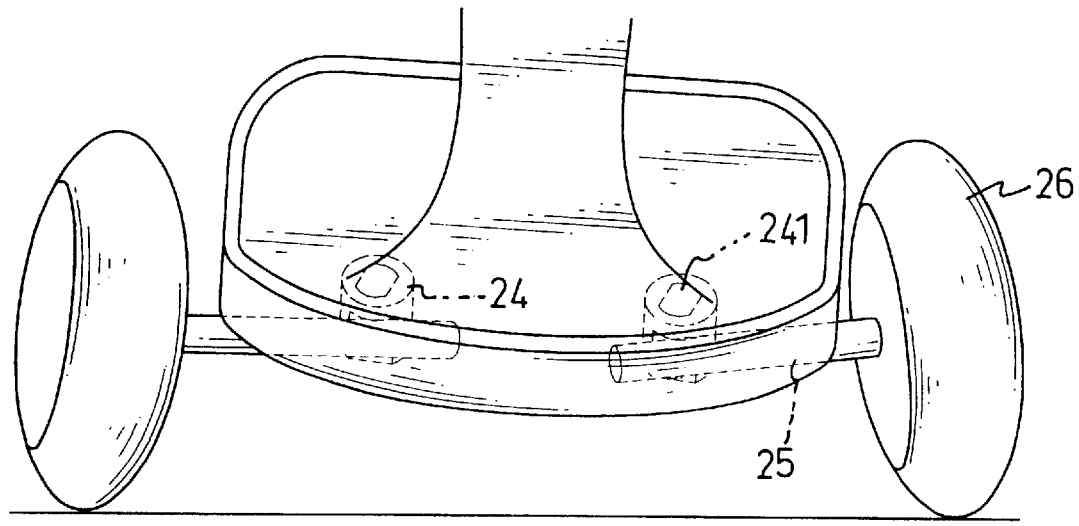
FIG. 7 is a front plan view of the front wheel assembly in FIG. 1 when the scooter turns left.
Figure 8:
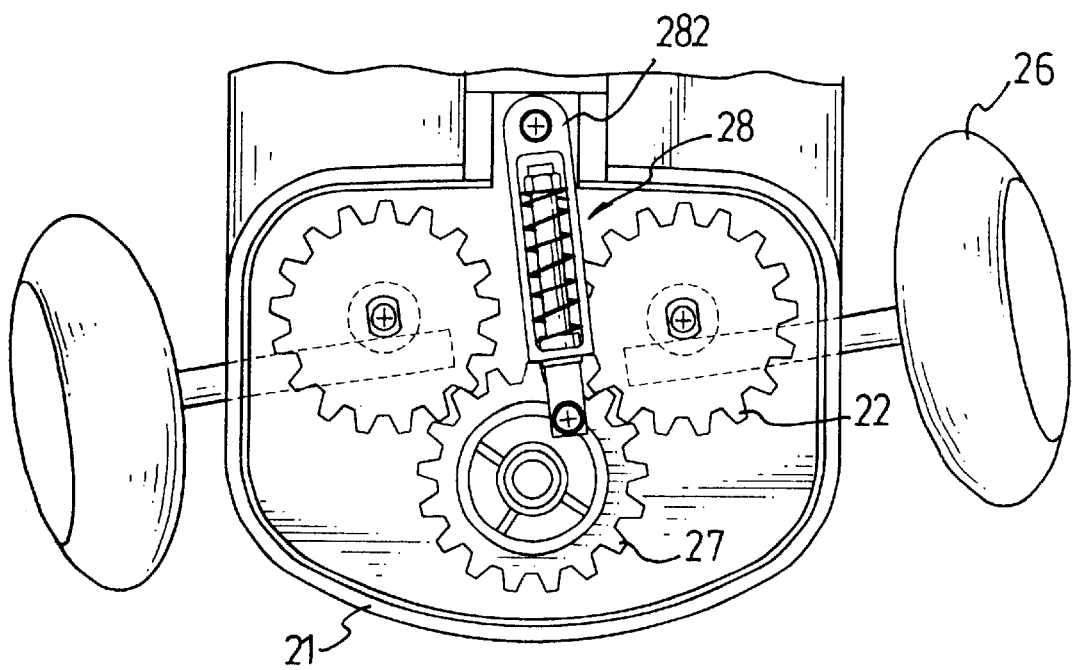
FIG. 8 is a top plan view of the front wheel assembly in FIG. 2 when the scooter turns left.
Figure 9:
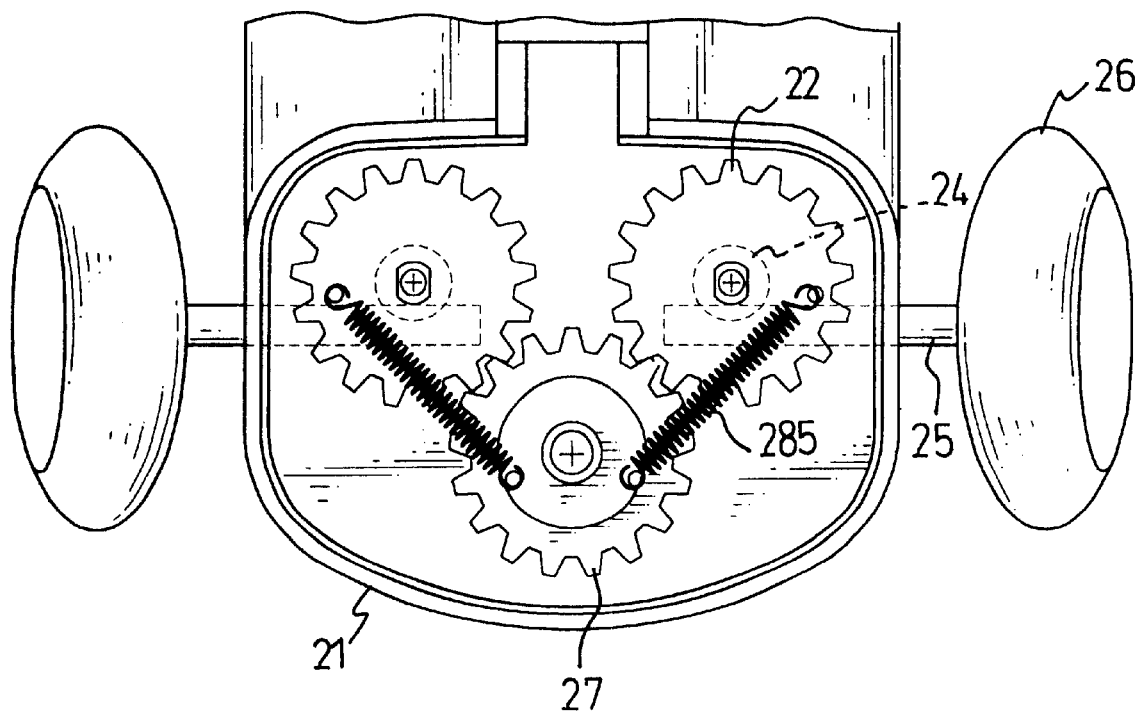
FIG. 9 is a top plan view of another embodiment of the front wheel assembly in accordance with the present invention for a scooter.

With reference to FIGS. 7–8, the scooter is turned left when the scooter leans toward the left side of the scooter. The method and the theory of turning the scooter left are the same as that of the scooter turned right. The only difference is the direction of rotation of the gears of the front wheel assembly. With reference to FIG. 9, a second embodiment of the restitution device (28) is simplified. The restitution device (28) includes two springs (285) each having a first end secured on different radii of the middle gear (27) and a second end secured on the drive gears (22) near the edge. The two springs correspond to each other.

Compared to conventional front wheel assemblies, the front wheel assembly in accordance with the present invention has several advantages.

1. The balance is better. A restitution device in the scooter helps the rider to return the scooter to horizontal when a turn is finished.

2. The structure is stable. The torque of the scooter during a turn is distributed to the gears and the shafts. The shafts have a diameter far greater than the pivot pins in the prior art. Consequently, the scooter with the front wheel assembly in accordance with the present invention can be used for a longer time.

Although the invention has been explained in relation to its preferred embodiment, it is to be understood that many other possible modifications and variations can be made without departing from the spirit and scope of the invention as hereinafter claimed.

What is claimed is:

1. A front wheel assembly for a skate vehicle comprising:
   a casing adapted to be mounted at a corner of an L-shaped main frame of the skate vehicle, with two through holes defined in a bottom of the casing, the bottom of the casing adapted to form an acute angle with a horizontal portion of the main frame;
   a shaft rotatably extending through each through hole in the casing, each shaft having a first end in the casing and a second end extending out of the casing;
   a drive gear secured on each shaft and having a through hole defined to receive the first end of the corresponding shaft;
   a block secured on each shaft and having a through hole defined to receive the corresponding shaft;
   an axle where a first end of which is secured on the block and a wheel is rotatably mounted on a second end;
   a middle gear rotatably mounted in the casing between and engaged to the two drive gears; and
   a restitution device mounted between the casing and the middle gear to provide a restitution force to the gears mounted in the casing.

2. The front wheel assembly for a skate vehicle as claimed in claim 1, wherein the restitution device comprises:
   a frame having a slot longitudinally defined in the frame, a first end pivotally attached to a connecting rod vertically extending from the bottom of the casing and a second end having a through hole defined to communicate with the slot;
   a rod partially and movably received in the slot of the frame, the rod having a first end forming an enlarged head and a second end extending through the through hole of the frame to be pivotally connected to the middle gear; and
   a spring compressively mounted around the rod and received in the slot of the frame, the spring having a first end abutting the enlarged head and a second end abutting the second end of the frame to provide a restitution force to the restitution device.

3. The front wheel assembly for a skate vehicle as claimed in claim 2, wherein the second end of the shaft is threaded and a nut is securely screwed onto the second end of each shaft to hold each block in place.

4. The front wheel assembly for a skate vehicle as claimed in claim 2, wherein the shaft, the through hole of the drive gear and the through hole of the block are polygonal.

5. The front wheel assembly for a skate vehicle as claim in claim 2, wherein the shaft and the axle form an acute angle.

6. The front wheel assembly for a skate vehicle as claimed in claim 1, wherein the restitution device comprises two springs each having a first end secured on a corresponding one of the drive gear and a second end secured on two different radii of the middle gear.

7. The front wheel assembly for a skate vehicle as claimed in claim 6, wherein the second end of the shaft is threaded and a nut is securely screwed onto the second end of each shaft to hold each block in place.

8. The front wheel assembly for a skate vehicle as claimed in claim 6, wherein the shaft, the through hole of the drive gear and the through hole of the block are polygonal.

9. The front wheel assembly for a skate vehicle as claim in claim 6, wherein the shaft and the axle form an acute angle.

10. The front wheel assembly for a skate vehicle as claimed in claim 1, wherein the second end of the shaft is threaded and a nut is securely screwed onto the second end of each shaft to hold each block in place.

11. The front wheel assembly for a skate vehicle as claimed in claim 1, wherein the shaft, the through hole of the drive gear and the through hole of the block are polygonal.

12. The front wheel assembly for a skate vehicle as claim in claim 1, wherein the shaft and the axle form an acute angle.

* * * * *